United States Patent [19]

Blome

[11] 4,342,664

[45] Aug. 3, 1982

[54] MOLTEN METAL FILTER

[75] Inventor: James C. Blome, Florissant, Mo.

[73] Assignee: Swiss Aluminium Ltd., Chippis, Switzerland

[21] Appl. No.: 152,598

[22] Filed: May 23, 1980

Related U.S. Application Data

[62] Division of Ser. No. 83,193, Oct. 9, 1979, Pat. No. 4,265,659.

[51] Int. Cl.³ .................. B01J 13/00; C04B 35/12; C04B 35/24
[52] U.S. Cl. .................. 252/313 R; 501/127; 501/132
[58] Field of Search ............. 252/313 R; 501/127, 501/132

[56] References Cited

U.S. PATENT DOCUMENTS 3,082,051   3/1963   Wainer et al. .............. 252/313 R

*Primary Examiner*—Henry R. Jiles
*Assistant Examiner*—Robert C. Whittenbaugh
*Attorney, Agent, or Firm*—Bachman and LaPointe

[57] ABSTRACT

The present invention provides a highly efficient, ceramic foam material for filtering molten metal which is characterized by improved strength reliability. The filter of the present invention is prepared by impregnating an organic foam material with an aqueous ceramic slurry containing ceramic fibers. In accordance with the present invention it has been found that it is possible to prepare a low cost, porous ceramic filtration medium having improved strength reliability.

2 Claims, 3 Drawing Figures

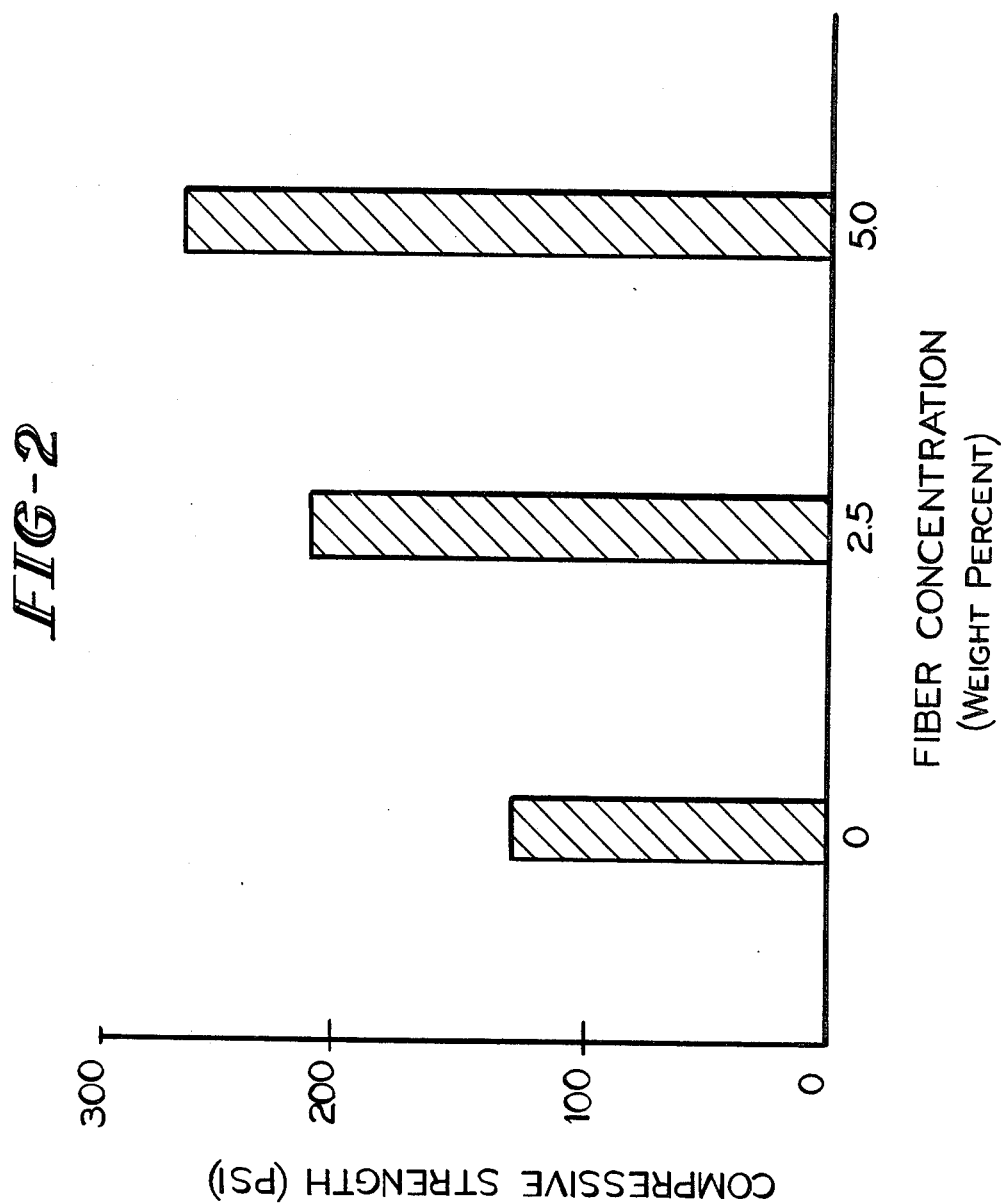

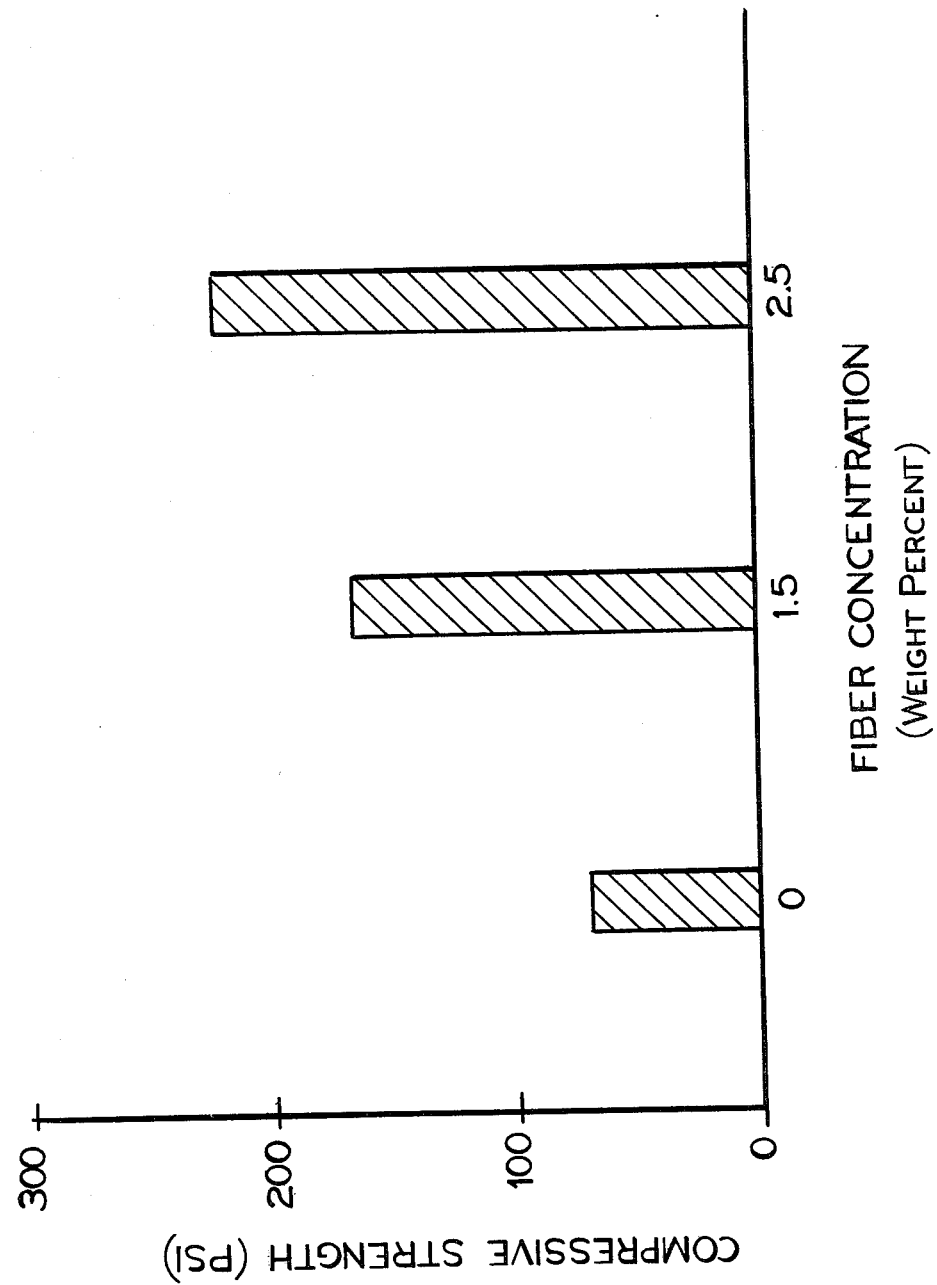

MOLTEN METAL FILTER

This is a division of application Ser. No. 83,193, filed Oct. 9, 1979, now U.S. Pat. No. 4,265,659.

BACKGROUND OF THE INVENTION

Molten aluminum in practice generally contains entrained solids which are deleterious to the final cast metal product. These entrained solids usually derive from three sources. Some are particles of aluminum oxide which are drawn into the liquid stream from the floating oxide layer on its surface, and some entrained particles are fragments of furnace lining, transfer trough and other portions of the molten aluminum handling equipment which are eroded and entrained in the flowing aluminum stream, and some particles are precipitates of insoluble impurities such as intermetallics, borides, carbides or precipitates of other aluminum compounds, such as chlorides. When these inclusions appear in the final cast product after the molten aluminum is solidified, they cause such final product to be less ductile or to have poor finishing characteristics. Accordingly, it is desirable to remove entrained solids from the molten aluminum stream before it is cast into a solid body which may be used as such or subjected to forming operations such as rolling, forging, extrusion, etc.

Filtering processes to remove entrained solids from liquids are accomplished by passing the solid-laden liquid through a porous filter medium that will not pass the solids. Filtering molten metal in general, and molten aluminum in particular, creates special problems because the liquid is so aggressive that it is difficult to find a filter medium capable of withstanding it.

In general, two methods of filtering are used for removing entrained solids from molten aluminum alloys before casting. The most common filter medium is an open weave glass cloth screen placed in the metal transfer trough, around the spout or even in the molten metal pool in the top of the solidifying ingot. These cloth screens are able to remove only the larger sizes of inclusions from the metal and are easily ruptured during use because the glass fibers become very weak at the temperature of molten aluminum. In another prior art procedure, molten aluminum is filtered through a bed of loose alumina particles, for example, of tabular alumina, but it often suffers from the drawbacks normally associated with bed filters in that it passes too many solids, there is a strong tendency to channeling which prevents efficient use, and pore size of the filter is not easily controlled but rather readily changes under conditions of use so that, even when originally of proper dimension, it cannot be efficiently maintained. In addition, the metal must be kept constantly molten when the filter is not in use.

An improved method for filtering and removing entrained solids from molten aluminum alloys is disclosed in U.S. Pat. No. 3,893,917, assigned to the assignee of the instant invention, and employs a ceramic foam filter having an open cell structure characterized by a plurality of interconnected voids surrounded by a web of ceramic. While the use of the ceramic foam filter greatly increases filtration efficiency there is a problem with the strength reliability of the filter element.

Accordingly, it is a principal object of the present invention to provide an improved molten metal filter and a method for preparing same and also a method for filtering molten metal therethrough.

It is an additional object of the present invention to provide a filter and method as aforesaid wherein said filter has improved strength reliability.

A further object of the present invention is to obtain a filter and method as aforesaid which obtains high filtration efficiency.

Further objects and advantages of the present invention will appear hereinafter.

SUMMARY OF THE INVENTION

In accordance with the present invention it has now been found that the foregoing objects and advantages may be readily achieved.

The present invention provides a highly efficient, ceramic foam material for filtering molten metal which is characterized by improved strength reliability. The filter of the present invention is prepared by impregnating an organic foam material with an aqueous ceramic slurry containing ceramic fibers. In accordance with the present invention it has been found that it is possible to prepare a low cost, porous ceramic filtration medium having improved strength reliability.

BRIEF DESCRIPTION OF THE DRAWINGS

FIGS. 2 and 3 illustrate the effect of ceramic fiber additions on the strength of ceramic foam filters.

DETAILED DESCRIPTION

Figure 1:
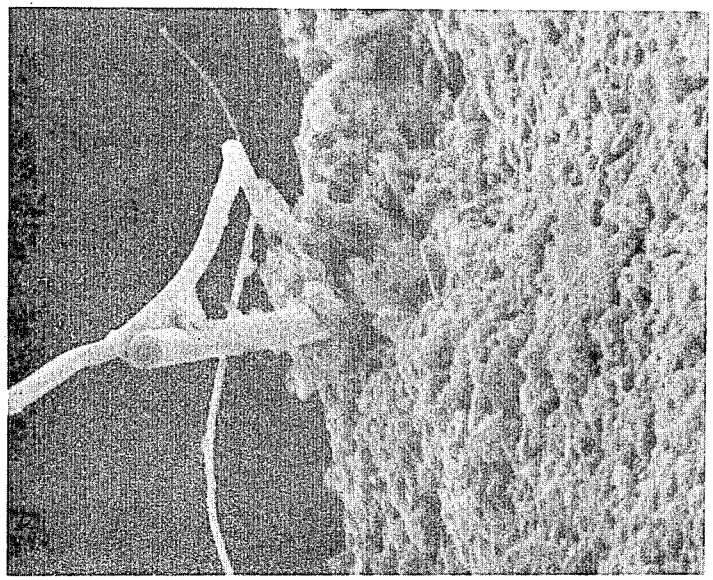
FIG. 1 is a photomicrograph showing the ceramic fibers in the filter of the present invention.

In accordance with the present invention the ceramic foam is prepared from an open cell, hydrophilic flexible foam material having a plurality of interconnected voids surrounded by a web of said flexible foam material. Typical material which may be used include the polymeric foams such as polyurethane foams, and the cellulosic foams. Generally, any combustible organic plastic foam may be used which has resilience and ability to recover its original shape. The foam must burn out or volatilize at below the firing temperature of the ceramic material which is employed. Also, one should use a foam material having from 5 to 100 pores per inch in order to provide the necessary filtration surface. The dimensions of the foam material may, of course, be varied depending upon the desired dimensions of the end filter material. Generally, one utilizes a foam material having a thickness of from $\frac{1}{4}$ to 4 inches, with from 1 to 3 inches being preferred.

The aqueous ceramic slurry which is employed depends naturally on the desired ceramic material for the chosen metal to be filtered. One must have sufficient properties in the final product to stand up to the particular molten metal with respect to chemical attack and structural and/or mechanical strength to stand up to the particular elevated temperature conditions. In addition, the slurry should have a relatively high degree of fluidity and be comprised of an aqueous suspension of the ceramic intended for use in the filter. Typical ceramic materials which may be employed include alumina, chromia, zirconia, magnesia, titanium dioxide, silica and mixtures thereof. A preferred ceramic material comprises 40 to 95% $Al_2O_3$; 1 to 25% $Cr_2O_3$; 0.1 to 12% bentonite; 0.1 to 12% kaolin; and 2.5 to 25% of an air setting agent. In accordance with the present invention, ceramic fiber additions are added to the ceramic slurry and dispersed therein by means of a high intensity mixer. It has been found that an addition of more than 5% by weight of ceramic fibers to the slurry results in clumping of the fibers and therefore good dispersion cannot be obtained. Furthermore, it has been found that an addition of at least 1% by weight is necessary to obtain a significant increase in strength. Ideally an addition in excess of 1.5% by weight is preferred.

The filter material of the present invention may be prepared in accordance with the general procedure outlined in U.S. Pat. No. 3,893,917 which is incorporated herein by reference. An aqueous ceramic slurry is prepared having ceramic fiber additions and the foam material is impregnated therewith so that the web is coated therewith and the voids are substantially filled therewith. The impregnated material is then compressed by squeezing through preset rollers so that preferably about 80% of the slurry is expelled and the balance is uniformly distributed throughout the foam material, preferably so that some pores are blocked in a uniformly distributed manner to increase the tortuosity. The coated foam material is then dried and heated to first burn out the flexible organic foam and then sinter the ceramic coating, thereby providing the fused ceramic foam having a plurality of interconnected voids surrounded by a web of bonded or fused ceramic in the configuration of the flexible foam. As can be seen with reference to FIG. 1, the ceramic fibers protrude out of the walls of the fused ceramic thereby providing a fuzzy surface on the pores of the filter which tend to improve filtration efficiency.

The present invention also provides a method of filtering molten metal through a disposable ceramic filter characterized as aforesaid by pouring said molten metal through the ceramic material at a rate of from 5.0 to 50 cubic inches per square inch of filter area per minute, and preferably from 10 to 30 cubic inches per square inch of filter area per minute for aluminum. Metal flow rates in normal aluminum casting operations vary from a minimum of about 200 lbs. per minute to a maximum in excess of 2000 lbs. of metal per minute, with a typical bulk metal flow rate being about 500 lbs. per minute. In accordance with the present invention the ceramic materials of the present invention are well suited to operate successfully utilizing bulk metal flow rates as described above. Normally, for aluminum, the particular specific flow rate of metal within the filter should not exceed 5 lbs. of metal per square inch of filter cross section per minute and preferably should be less than 3 lbs. per square inch per minute. Higher flow rates through the filter than indicated above results in the filters passing too many undesirable nonmetallics for the production of a high grade sheet product. The lower limit is governed by practical size considerations and would require an impractically large filter to handle bulk metal flow rates in excess of 1000 lbs. per minute, that is, a ceramic filter greater than 45 inches square or 2025 square inches would be required. A typical filter of the present invention may, therefore, be defined as being 16 inches square or about 250 square inches designed to pass 500 lbs. of metal per minute at a specific flow rate of 2 lbs. per square inch per minute.

The present invention provides a highly efficient ceramic foam material for use in filtering molten metal, especially molten aluminum. The ceramic foam material of the present invention is characterized by having an open cell structure with a plurality of interconnected voids surrounded by a web of said ceramic material having ceramic fibers. The filter of the present invention is further characterized by a combination of critical characteristics. The filter has an air permeability in the range of from 400 to $8000 \times 10^{-7}$ cm$^2$. In addition, the filter of the present invention has a porosity or void fraction of 0.80 to 0.95. Still further, the filter of the present invention is characterized by from 5 to 45 pores per linear inch and an effective range of filter thickness of from $\frac{1}{4}$ to 4 inches. It has been found that in accordance with the present invention the foregoing filter is particularly useful in the filtration of molten metal, especially molten aluminum. Numerous advantages are achieved utilizing the filter of the present invention, some of which are referred to above and as will be discussed hereinbelow.

In the normal situation one uses a relatively fine filter of the present invention having an air permeability of from 400 to $2500 \times 10^{-7}$ cm$^2$, a porosity or void fraction of 0.80 to 0.95 and from 20 to 45 pores per linear inch, especially if one is filtering an aluminum alloy of the 5000 series. However, if the input metal is particularly dirty, one should preliminarily filter the metal through a relatively coarse ceramic foam filter having a pore size of between 5 and 20 ppi, air permeabilities of 2500 to $8000 \times 10^{-7}$ cm$^2$ and porosities or void fractions of between 0.90 and 0.95. This may be accomplished by providing a single ceramic filter with a gradation of properties or by using a series of filters of differing porosity.

In accordance with the present invention, the specific features thereof will be more readily understandable from a consideration of the following illustrative examples.

EXAMPLE I

Three 100 gram batches of aqueous ceramic slurry comprising 47% Al$_2$O$_3$, 13% Cr$_2$O$_3$, 3.5% kaolin, 1.0% bentonite and 14.5% of an air setting agent was prepared. No ceramic fiber additions were made to the first batch. The second and third batches contained 2.5 and 5.0% by weight, respectively, ceramic fibers in the form of aluminosilicate. The second and third batches were agitated using a high intensity mixer so as to disperse the fibers in the slurry and break up any clumping which may have been present. A piece of polyurethane foam material having a thickness of 2 inches and containing 30 pores per linear inch was immersed in each of the three batches of slurry. A ceramic foam filter was then prepared in accordance with the general procedures outlined in U.S. Pat. No. 3,893,917.

Each of the filters as prepared as outlined above were subjected to compression tests and the results are set forth in FIG. 1. As can be seen from FIG. 1, the compressive strength of the ceramic foam filter was increased as the ceramic fiber concentration increased thus indicating an improvement in the strength reliability of the filter element.

EXAMPLE II

A second ceramic slurry composition comprising 100% α-alumina was prepared and divided into three batches wherein the second and third batches were provided with a 1.5 and 2.5 weight percent addition of ceramic fibers, respectively, in the form of aluminosilicate. The ceramic slurries were then used to impregnate a polyurethane foam material and filter elements were prepared as outlined in U.S. Pat. No. 3,893,917.

FIG. 2 shows the results of compression tests run on the ceramic foam filters prepared from the three ceramic slurries. Again, as in the case with Example I the addition of ceramic fibers results in an increase in the compressive strength of the filter elements thereby indicating an increase in the strength reliability of the filter elements.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An aqueous slurry for use in preparing a high temperature resistant ceramic foam having the following composition: 40 to 95% $Al_2O_3$; 1 to 25% $Cr_2O_3$; 0.1 to 12% bentonite; 2.5 to 25% of an air setting agent which is substantially nonreactive to the molten metal and up to 5% by weight ceramic fibers.

2. A slurry according to claim 1 containing from 1.5 to 5% by weight ceramic fibers.

* * * * *